United States Patent
Wu et al.

(10) Patent No.: US 8,605,203 B2
(45) Date of Patent: Dec. 10, 2013

(54) AUTO-FOCUSING CAMERA MODULE AND IMAGING METHOD USING SAME

(75) Inventors: Ting-Yuan Wu, New Taipei (TW); Sung-Ching Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 34 days.

(21) Appl. No.: 13/489,468

(22) Filed: Jun. 6, 2012

(65) Prior Publication Data
US 2013/0162849 A1    Jun. 27, 2013

(30) Foreign Application Priority Data
Dec. 27, 2011    (TW) .............................. 100148768 A

(51) Int. Cl.
*H04N 5/232*    (2006.01)
*H04N 5/228*    (2006.01)

(52) U.S. Cl.
USPC ................ 348/345; 348/208.99; 348/349

(58) Field of Classification Search
USPC .............. 348/208.6, 208.7, 208.11, 208.99, 348/208.2, 345, 222.1, 352
See application file for complete search history.

(56) References Cited

U.S. PATENT DOCUMENTS

| | | | |
|---|---|---|---|
| 7,260,270 B2 * | 8/2007 | Kusaka | 382/275 |
| 2002/0122133 A1 * | 9/2002 | Ejima | 348/362 |
| 2008/0180536 A1 * | 7/2008 | Nakahara | 348/208.99 |

* cited by examiner

*Primary Examiner* — Nhan T Tran
*Assistant Examiner* — Chan Nguyen
(74) *Attorney, Agent, or Firm* — Altis Law Group, Inc.

(57) ABSTRACT

An auto-focusing camera module includes a lens module, an image sensor, a color separation unit, a main processor unit, an image processing unit and an OIS unit. The lens module captures an image of object. The image sensor senses the image captured by the lens module. The color separation unit separates the image into red, green and blue colors. The main processor unit calculates MTF values of the image and determines a shooting mode of the auto-focusing camera. The image processing unit processes the image according to the MTF values to compensate for blurring of the image caused by being out of focus. The driving unit drives the lens module to focus the image on the image sensor according to MTF values. The OIS unit detects shaking before shooting and drives the lens module to compensate for the detected shaking.

12 Claims, 6 Drawing Sheets

AUTO-FOCUSING CAMERA MODULE AND IMAGING METHOD USING SAME

BACKGROUND

1. Technical Field

The present disclosure relates to camera modules and imaging methods using the camera modules, and particularly, relates to an auto-focusing camera module and an imaging method using the auto-focusing camera module.

2. Description of Related Art

Digital auto-focusing technology allows blurred images (out of focus images) to be processed by software modules, which may employ an extend depth of field (EDOF) technology, to get a sharp image. However, the digital auto-focusing technology does not work properly if an object distance is short, e.g. less than 40 cm. Furthermore, the digital auto-focusing technology may not work effectively when the camera is shaking.

What is needed therefore is an auto-focusing camera module and imaging method using the camera module addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
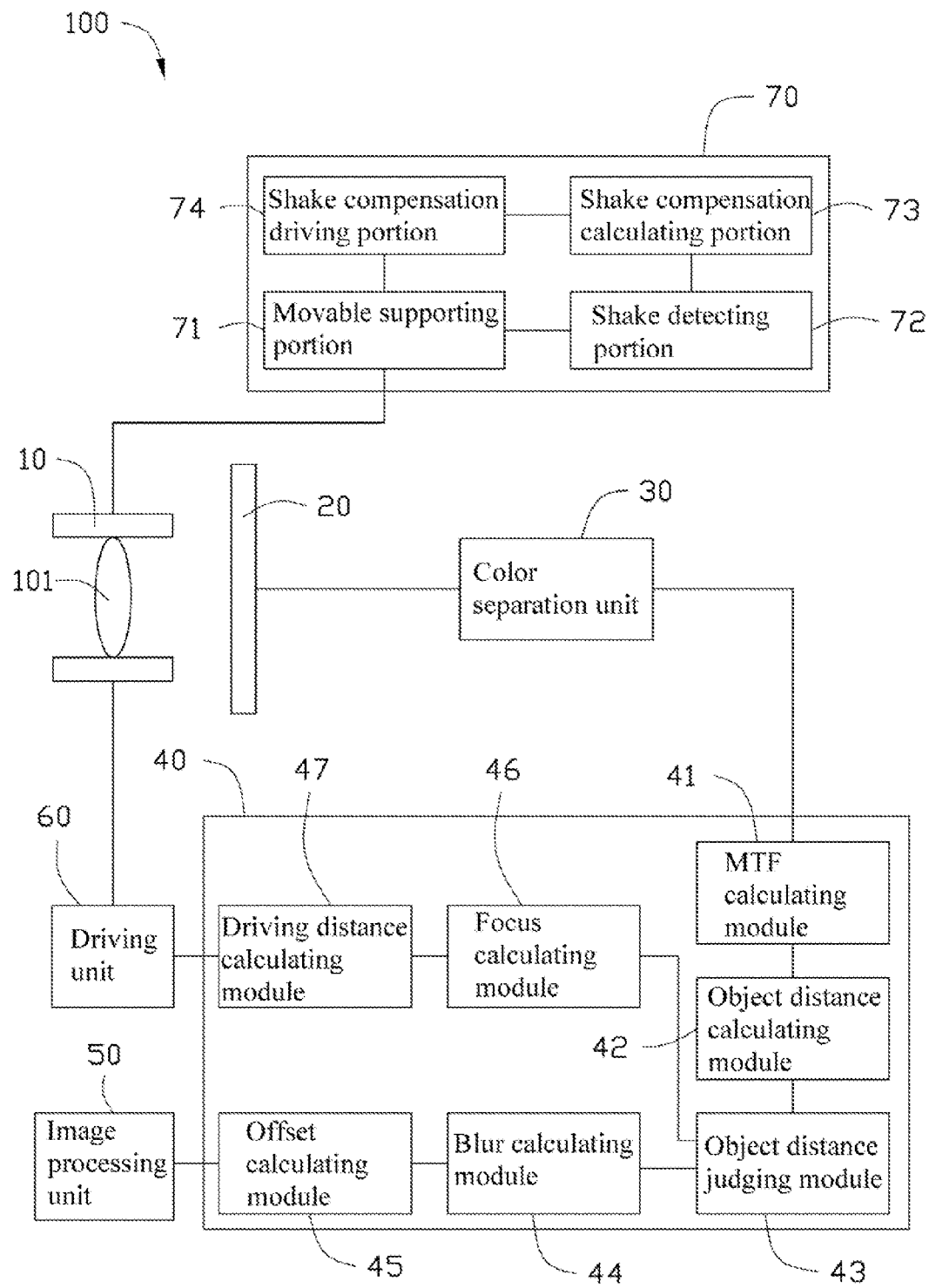
FIG. 1 is a schematic view of an auto-focusing image module, according to an exemplary embodiment of the present disclosure, the auto-focusing image module comprising a lens module.

Referring to FIG. 1, an auto-focusing camera module 100, according to an exemplary embodiment of the present invention, is shown. The auto-focusing camera module 100 includes a lens module 10, an image sensor 20, a color separation unit 30, a main processor unit 40, an image processing unit 50, a driving unit 60, and an optical image stabilizer (OIS) unit 70. A center of the image sensor 20 is aligned with an optical axis of the lens module 10. The color separation unit 30 is electrically connected to the image sensor 20, the main processor unit 40 is electrically connected to the color separation unit 30, and the image processing unit 50 and the driving unit 60 are both electrically connected to the main processor unit 40. The driving unit 60 is also connected to the lens module 10. The OIS unit 70 is connected to the lens module 10.

The lens module 10 captures images of an object(s) and focuses the images onto a sensing area of the image sensor 20. The lens module 10 includes at least one piece of lens 101. In this embodiment, the lens 101 is an aspherical lens.

The image sensor 20 senses the images captured by the lens module 10. The image sensor 20 includes a number of pixel units arranged in the sensing area, each pixel unit includes a red pixel, a green pixel and a blue pixel. In one embodiment, the number of the pixel units 20 is not less than 2048×1536. In this illustrated embodiment, the image sensor 20 can be a charge-coupled device (CCD) or a complementary metal oxide semiconductor (CMOS). An image sensed by the image sensor 20 comprises a number of image portions corresponding to the pixel units.

The color separation unit 30 separates an image sensed by the image sensor 20 into red, green and blue colors. In detail, each image portion of the image is separated into a red color part, a green color part and a blue color part, the red color parts of the image portions construct the red image, the green parts of the image portions construct the green image, and the blue parts of the image portions construct the blue image.

The main processor unit 40 includes a modulation transfer function (MTF) calculating module 41, an object distance calculating module 42, an object distance judging module 43, a blur calculating module 44, an offset calculating module 45, a focus calculating module 46 and a driving distance calculating module 47. The MTF calculating module 41 is electrically connected to the color separation unit 30, the object distance calculating module 42 is electrically connected to the MTF calculating module 41, the object distance judging module 43 is electrically connected to the object distance calculating module 42, the focus calculating module 46 and the blur calculating module 44 are electrically connected to the object distance judging module 43, the offset calculating module 45 is electrically connected to the blur calculating module 44 and the image processing unit 50, and the driving distance calculating module 47 is electrically connected to the focus calculating unit 46 and the driving unit 60.

The MTF calculating module 41 calculates MTF values of each image portion of an image sensed by the image sensor 20. In this embodiment, the MTF calculating module 41 respectively calculates MTF values of the red part, the green part and the blue part of each image portion.

The object distance calculating module 42 calculates an object distance of an object in each image portion of the image according to the MTF values calculated by the MTF calculating module 41.

The object distance judging module 43 determines a shooting mode according to the object distances calculated by the object distance calculating module 41. In detail, the object distance judging module 43 analyzes the object distances calculated by the object judging module 43, compares the results with a predetermined distance value(s), and determines the shooting mode. In this embodiment, the object distance judging module 43 analyzes the object distances of the pixel units and generates a main object distance representing the distance-to-object distance of a main object in the image. The predetermined distance value is used for distinguishing the shooting mode of the auto-focusing camera module 100. In this embodiment, the predetermined distance value is 40 cm. If the main object distance is more than 40 cm, the auto-focusing camera module 100 is set at a long shooting mode; if the main object distance is equal to or less than 40 cm, the auto-focusing camera module 100 is set at a close shooting mode.

The blur calculating module 44 compares the MTF values of each image portion of the image calculated by the MTF calculating module 41 with corresponding predetermined MTF values, calculates the differences between the obtained MTF values and the predetermined MTF values, and generates blur quantities of each image portion of the image. Each of the predetermined MTF values is an MTF value applying to the object in the image which is the sharpest, and the predetermined MTF values are different corresponding to different object distances. In this embodiment, the blur calculating module 44 calculates the blur quantities of the red part, the green part and the blue part of each image portion. The blur calculating module 44 may select on state or off state for the blur calculating function thereof according to the shooting manner determined by the object distance judging module 43. In this embodiment, if the auto-focusing camera module 100 is set at a long shooting mode, the blur calculating module 44 switches on the blur calculating function, and if the auto-focusing camera module 100 is set at a close shooting mode, the blur calculating module 44 switches off the blur calculating function.

The offset calculating module 45 calculates offsets to compensate for blurring of each image portion according to the calculated result of the blur calculating module 44. In this embodiment, the offset calculating module 45 calculates offsets of the red part, the green part and the blue part of each image portion.

The focus calculating module 46 calculates an optimum focusing position of the lens module 10 according to the calculated result of the object distance calculating module 42. The focus calculating module 46 may select on state or off state for the focus calculating function thereof according to the shooting mode determined by the object distance judging module 43. In this embodiment, if the auto-focusing camera module 100 is set at a long shooting mode, the focus calculating module 46 switches off the focus calculating function; if the auto-focusing camera module 100 is set at a close shooting mode, the focus calculating module 46 switches on the focus calculating function.

The driving distance calculating module 47 calculates a driving distance of the lens module 10 according to the optimum focusing position calculated by the focus calculating module 46.

The image processing unit 50 processes the image according to the calculated result of the offset calculating module 45 to get a sharp processed image. In detail, the image processing unit 50 compensates any blurring of each image portion of the image according to the offsets calculated by the offset calculating module 45. In this embodiment, the image processing unit 50 compensates for the blurring of the red color portion, the green color portion, and the blue color portion of each image portion.

The driving unit 60 drives the lens module 10 to the optimum focusing position according to the driving distance calculated by the driving distance calculating module 47. In this embodiment, the driving unit 60 is a piezoelectric actuator. Alternatively, the driving unit 60 can be a voice coil motor (VCM).

The OIS unit 70 includes a movable supporting portion 71, a shake detecting portion 72, a shake compensation calculating portion 73, and a shake compensation driving portion 74. The movable supporting portion 71 supports the lens 101 and is movable perpendicular to the optical axis. The shake detecting portion 72 detects any shaking of the lens 101 during shooting and transmits the detecting result to the shake compensation calculating portion 73. The shake compensation calculating portion 73 calculates a compensation value for compensating the shake of the lens 101 according to the detecting result from the shake detecting portion 72. The shake compensation driving portion 74 drives the movable supporting portion 71, so as to move the lens 101 to compensate the shaking of the lens 101 according to the compensation value calculated by the shake compensation calculating portion 73.

During shooting, the driving unit 60 drives the lens 102 to move along the optical axis, and the OIS unit 70 drives the lens 101 to move in a direction perpendicular to the optical axis, thus any shaking of the lens 101 in focusing is compensated.

Figure 2:
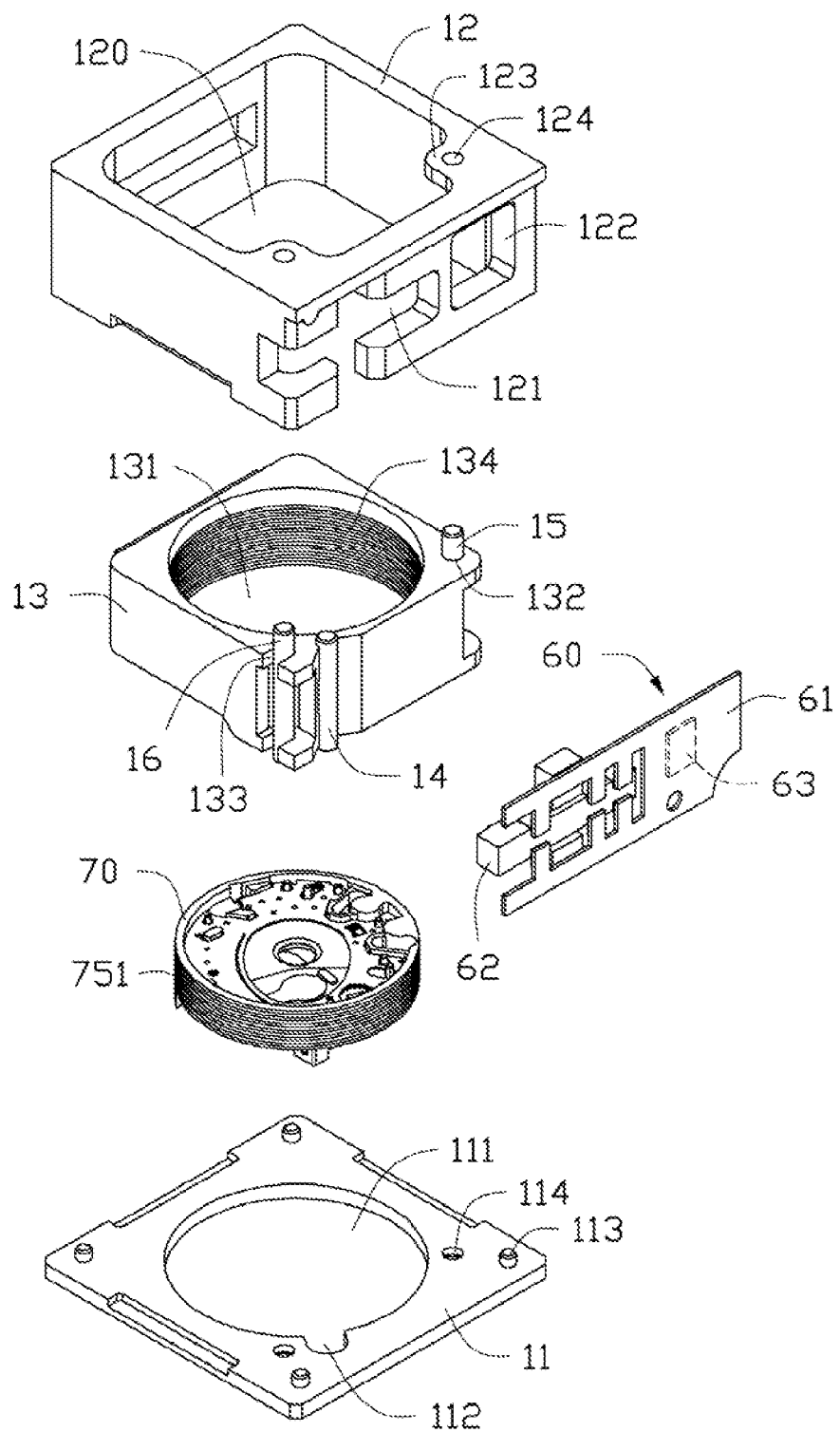
FIG. 2 is an exploded view of the lens module of FIG. 1, the lens module comprising an optical image stabilizing (OIS) unit.

Referring to FIG. 2, the driving unit 60 and the OIS unit 70 can be assembled with the lens module 10. The lens module 10 includes a base 11, a fixed frame 12, and a movable frame 13, a drive rod 14, a first guiding rod 15, and a second guiding rod 16.

The base 11 is substantially rectangular. The base 11 defines a circular light passing hole 111 and an arc-shaped receiving cutout 112 communicating with the light passing hole 111. The light passing hole 111 is defined in a central portion of the base 11, and the receiving cutout 112 is defined in an inner surface of the base 11. The base 11 includes a number of protrusions 113 upwardly protruding from a surface of the base 11. In this embodiment, there are four protrusions 113, and the protrusions 113 are respectively formed at the corners of the base 13. The base 11 further defines two fixing holes 114 respectively located at two neighboring corners of the base 11.

The fixing frame 12 is substantially rectangular. The fixing frame 12 defines a first receiving space 120 for receiving the movable frame 13, a first receiving opening 121 and a second receiving opening 122. The first receiving opening 121 and the second receiving opening 122 are defined in a sidewall of the fixing frame and communicate with the first receiving space 120. The fixing frame 12 includes two protruding portions 123 formed on an upper surface of the fixing frame 12, the protruding portions 123 are located at two neighboring corners of the fixing frame 12 and protrude to a center of the fixing frame 12. Each protruding portion 124 defines an engaging hole 124 corresponding to a respective fixing hole 114 in the base 11.

The movable frame 13 is substantially rectangular. The movable frame 13 defines a circular second receiving space 131, a through hole 132, and a cutout 133. The through hole 132 and the cutout 133 are respectively located at two neighboring corners of the movable frame 13. The through hole 132 spatially corresponds to one of the engaging holes 124, and the cutout 133 spatially corresponds to the other of the engaging holes 124. The movable frame 13 includes an internal threaded portion 134 formed in an inner surface of the movable frame 13.

In assembly of the lens module 10, the movable frame 13 is movably received in the first receiving space 120 of the fixing frame 12. The first guiding rod 15 passes through the through hole 132 and an end of the first guiding rod 15 is fixed in one of the engaging holes 124. The second guiding rod 16 passes through the cutout 133 and an end of the second guiding rod 16 is fixed in the other of the engaging holes 124. The drive rod 14 is fixed on a corner of the movable frame 13 near the second guiding rod 16. The base 11 is fixedly connected to a lower end of the fixing frame 12, the protrusions 113 insert into a surface of the fixing frame 12 at the lower end. The other end of the first guiding rod 15 is fixed in one of the fixing holes 114, and the other end of the second guiding rod 16 is fixed in the other of the fixing holes 114. An end of the drive rod 14 near the base 11 is received in the receiving cutout 112.

The driving unit 60 is fixed in a sidewall of the fixing frame 12 and makes contact with the movable frame 13 for driving the movable frame 13 to move along the optical axis. In this embodiment, the driving unit 60 includes a circuit board 61, a piezoelectric member 62 and a driving chip 63. The piezoelectric member 62 and the driving chip 63 are fixed on the circuit board 61 and electrically connected to each other via the circuit board 61. The circuit board 61 is fixedly attached on an outer surface of the sidewall of the fixed frame 12. The piezoelectric member 62 is received in the first receiving opening 121 and is in contact with the driven rod 14 of the movable frame 13. The driving chip 63 is received in the second receiving opening 122.

Figure 3:
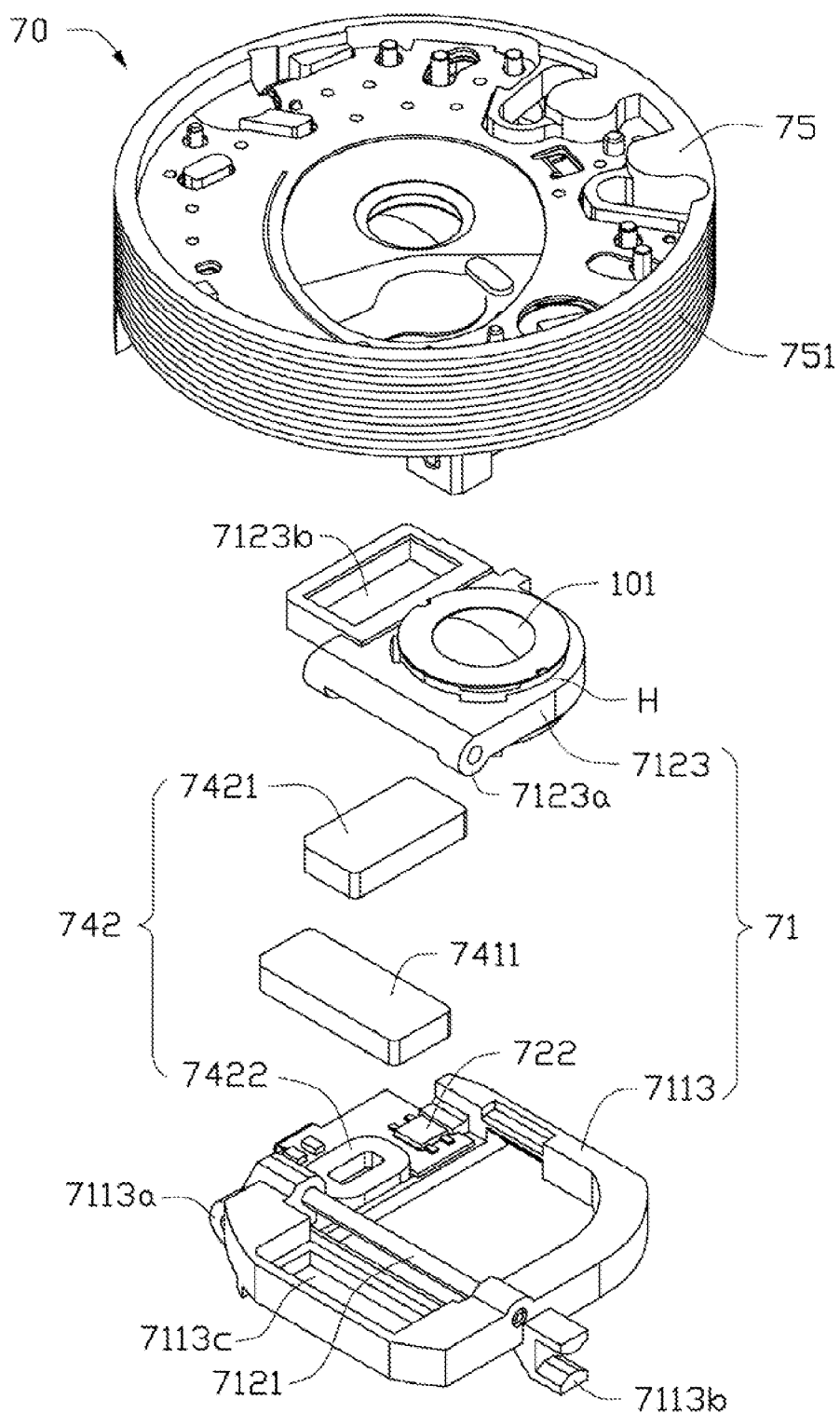
FIG. 3 is an exploded view of the OIS unit of FIG. 2.
Figure 4:
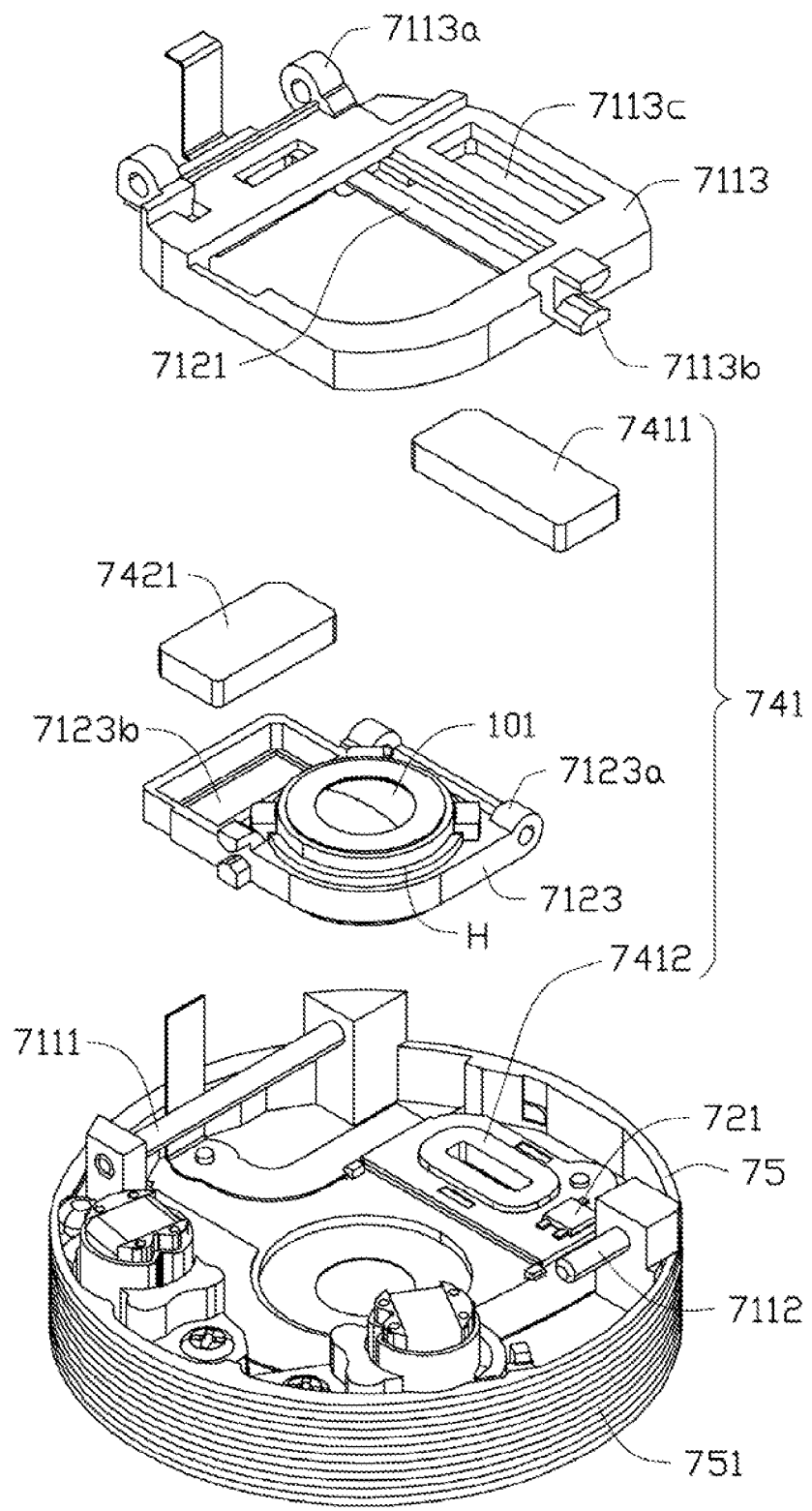
FIG. 4 is similar to FIG. 3, but showing the OIS unit from another angle.

The OIS unit 70 is received in the second receiving space 131 of the movable frame 13. Referring to FIGS. 3-4, in this embodiment, the OIS unit 70 includes a fixed barrel 75. The fixed barrel 75 includes an external threaded portion 751 corresponding to the internal threaded portion 134 of the movable frame 13.

The movable supporting portion 71 includes a first slidable member 7113 and a second slidable member 7123.

The fixed barrel 75 includes a first direction guiding rod 7111 and a first auxiliary guiding rod 7112 substantially parallel to the first direction guiding rod 7111. The first guiding rod 7111 and the first auxiliary guiding rod 7112 guide the first slidable member 7113 along a first direction substantially perpendicular to the optical axis. The first slidable member 7113 is substantially rectangular. The first slidable member 7113 includes a first yoke portion 7113a and a first auxiliary yoke portion 7113b. The first yoke portion 7113a and the first auxiliary yoke portion 7113b are respectively positioned on two opposite outer sides of the first slidable member 7113. The first slidable member 7113 defines a first mounting groove 7113c in a sidewall thereof.

The first slidable member 7113 includes a second direction guiding rod 7121. The second direction guiding rod 7121 guides the second slidable member 7123 to move along a second direction substantially perpendicular to the first direction and the optical axis. The second slidable member 7123 includes a second yoke portion 7123a on its outer side. The second slidable member 7123 defines a second mounting groove 7123b in a sidewall thereof and a lens mounting hole H in a central portion thereof. The lens 101 is fixedly received in the lens mounting hole H.

The shake detecting portion 72 includes a first Hall member 721 and a second Hall member 722. The first Hall member 721 is fixed on the fixed barrel 75, and the second Hall member 722 is fixed on the first slidable member 7113.

The shake compensation driving portion 74 includes a first direction driving unit 741 and a second direction driving unit 742. The first direction driving unit 741 includes a first magnet 7411 and a first coil 7412. The first coil 7412 is fixed on the fixed barrel 75 close to the first Hall member 721. The second direction driving unit 742 includes a second magnet 7421 and a second coil 7422. The second coil 7422 is fixed on the first slidable member 7113 close to the second Hall member 722.

In assembly of the OIS unit 70, the first magnet 7411 is fixedly received in the first mounting groove 7113c, the first yoke portion 7113a is a sliding fit on the first direction guiding rod 7111, and the first auxiliary yoke portion 7113b is a sliding fit on the first auxiliary guiding rod 7112. The first direction guiding rod 7111 and the first auxiliary guiding rod 7112 are respectively fixed at two opposite sides of the fixed barrel 75. The second magnet 7421 is fixedly received in the second mounting groove 7123b, and the second yoke portion 7123a is a sliding fit on the second direction guiding rod 7121. In the assembled OIS unit 70, the first Hall member 721 and the first coil 7412 are aligned with the first magnet 7411 along the optical axis, and the second Hall member 722 and the second coil 7422 are aligned with the second magnet 7421 along the optical axis.

The assembled OIS unit 70 is fixedly received in the second receiving space 120. The external threaded portion 751 of the fixed barrel 75 engages with the internal threaded portion 134 of the movable supporting frame 13.

In use, the first magnet 7411 forms a first magnetic field around the first coil 7412 and the first Hall member 721, and the second magnet 7421 forms a second magnetic field around the second coil 7422 and the second Hall member 722. If no shaking occurs, the intensities of the first magnetic field and the second magnetic field are constant. If any shake does occur, the first slidable member 7113 may deviate from its original position along the first direction, and/or the second slidable member 7123 may deviate from its original position along the second direction.

If the first slidable member 7113 deviates along the first direction, the intensity of the first magnetic field around the first Hall member 721 will accordingly change, which is detected by the first Hall member 721. Therefore, the amount of any deviation of the first slidable member 7113 along the first direction can be calculated according to the changing of the intensity of the first magnetic field detected by the first Hall member 721, and a compensating offset can be calculated by the shake compensation calculating portion 73 for the first slidable member 7113. If the second slidable member 7123 deviates along the second direction, the intensity of second magnetic field around the second Hall member 722 will accordingly change, then the second Hall member 722 can detect the changing of the intensity of the second magnetic field around the second Hall member 722. Therefore, any deviation of the second slidable member 7123 along the second direction can be calculated according to the changing of the intensity of the second magnetic field detected by the second Hall member 722, and a compensating offset for the second slidable member 7123 can be calculated by the shake compensation calculating portion 73.

The first coil 7412 can produce a magnetic force to alter the natural position(s) of the first slidable member 7113 so as to compensate for the deviation, by outputting a current calculated to negate any deviation of the first slidable member 7113. The second coil 7422 can function in exactly the same manner in relation to the second slidable member 7123. By these means, an image stabilizing function of the auto-focusing camera module 100 can be achieved.

Furthermore, the driving chip 63 controls the piezoelectric member 62 to move the movable supporting frame 13 along the optical axis according to the driving distance calculated by the driving distance calculating module 47, thus the lens 101 can be located at an optimum focusing position.

Figure 5A:
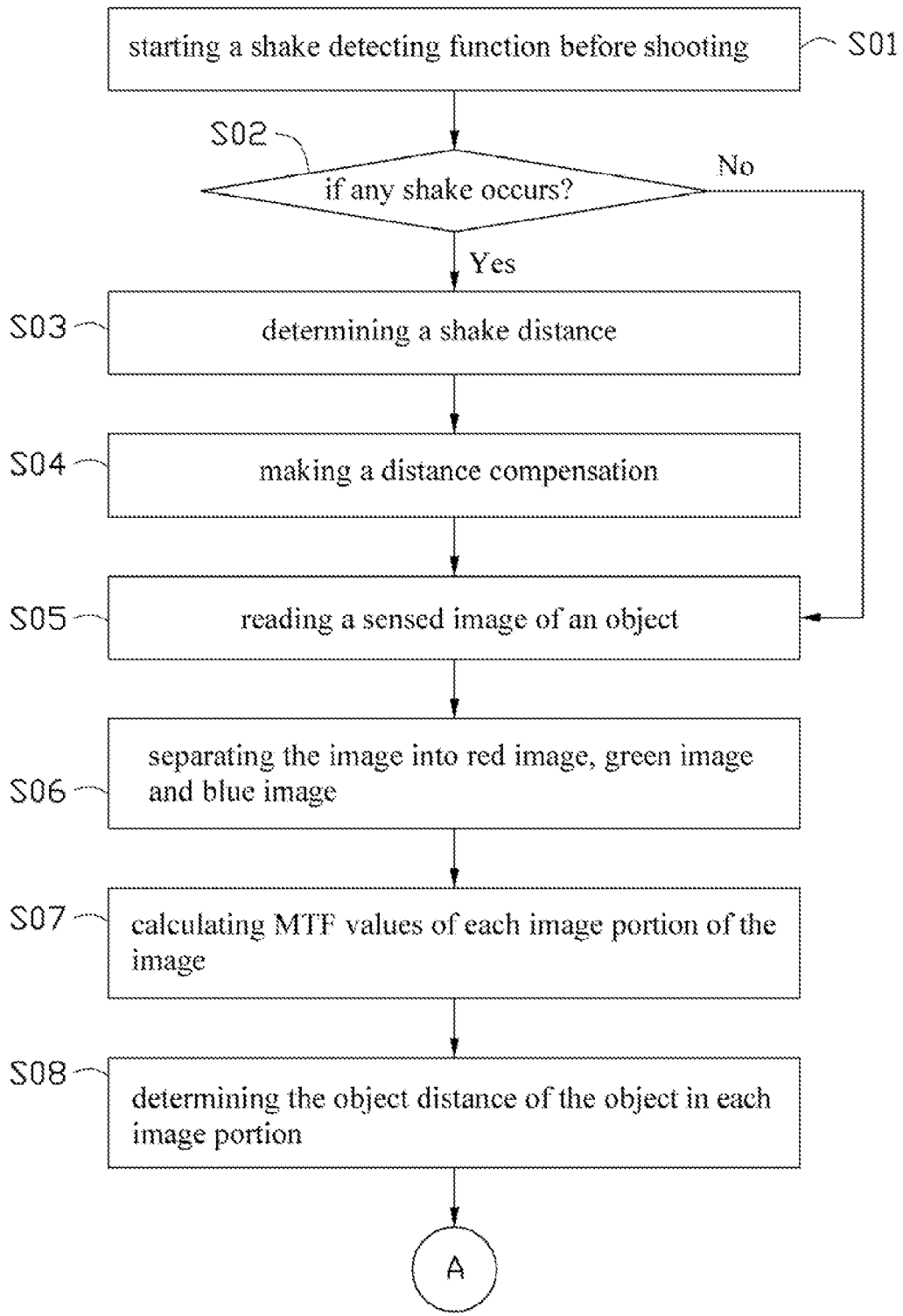
FIGS. 5A and 5B are flowcharts of an imaging method, according to another exemplary embodiment of the present disclosure.
Figure 5B:
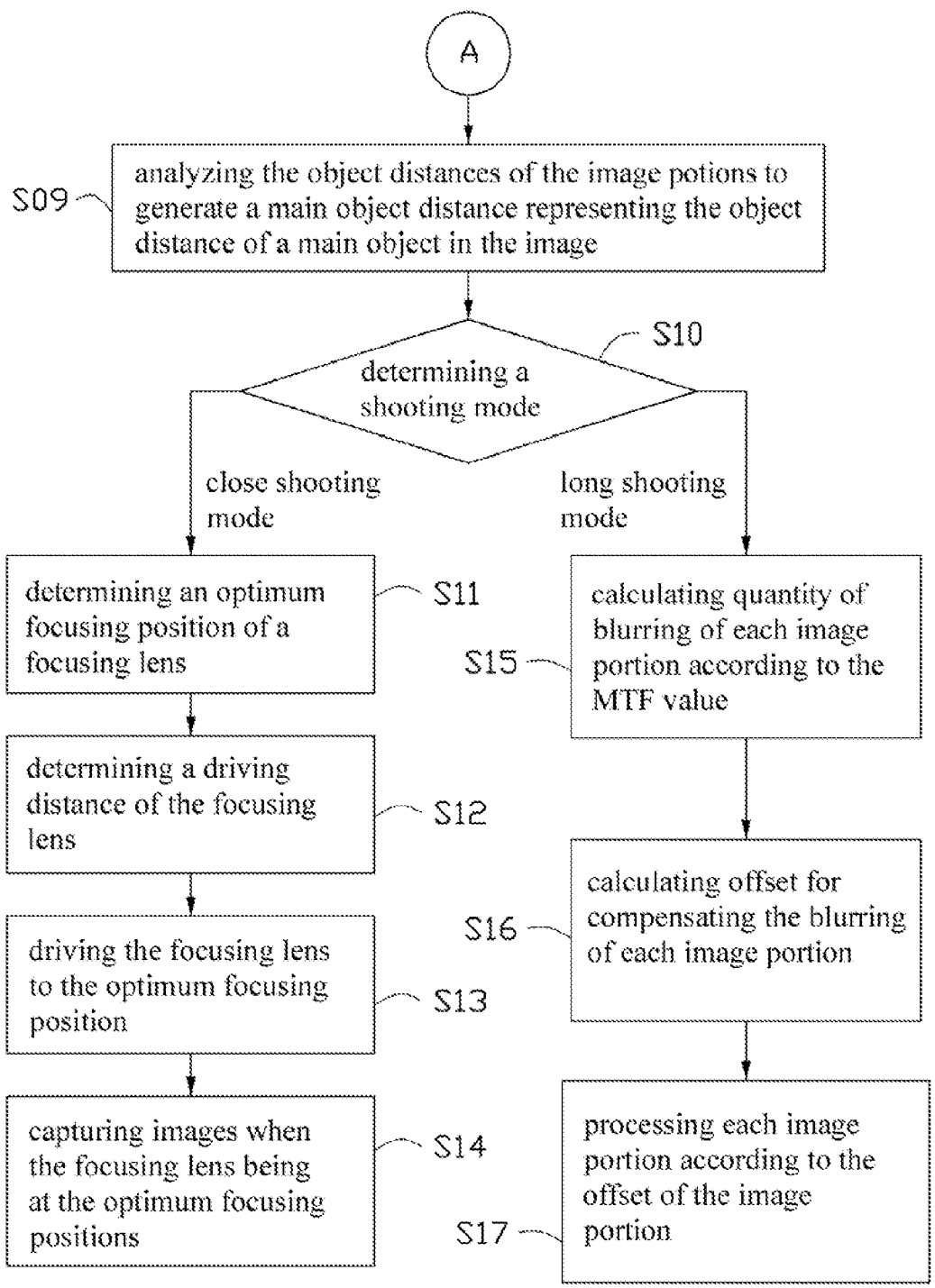

Referring to FIG. 5A and FIG. 5B, another exemplary embodiment of an imaging method using the auto-focusing camera module 100 is shown. The imaging method includes the following described steps.

In S01, a shake detecting function of the auto-focusing camera module 100 is started before shooting.

In S02, whether any shaking occurs before shooting is determined by the shake detecting function.

In S03, a shake distance is determined upon a condition that any shake occurs.

In S04, a distance compensation for the shake distance is made.

In S05, an image sensed by the image sensor 20 is read.

In S06, the image is separated into red, green and blue colors. Each image portion of the image is separated into a red color part, a green color part and a blue color part.

In S07, MTF values of each image portion of the image are calculated. The MTF values of the red part, the green part and the blue part of each image portion are calculated.

In S08, the object distance of the object in each image portion is determined according to the MTF values of each image portion.

S09, analyzing the object distances of the image potions to generate a main object distance representing the object distance of a main object in the image;

In S10, a shooting mode of the auto-focusing camera module 100 is determined according to the object distance of the object in each image portion.

If the auto-focusing camera module 100 is set at a close shooting mode, the following steps are executed:

In S11, an optimum focusing position of the lens 101 is determined according to the object distance of the object in each image portion.

In S12, a driving distance of the lens 101 is determined according to the optimum focusing position.

In S13, the lens 101 is driven to the optimum focusing position according to the driving distance.

In S14, a properly focused image is captured by the auto-focusing camera module 100.

If the auto-focusing camera module 100 is set at a long shooting mode, the following step are executed:

In S15, the quantity of blurring of each image portion is calculated according to the MTF values.

In S16, offset for compensating the blurring of each image portion is calculated according to the quantity of blurring of each image portion.

In S17, each image portion is processed according to the offset of each image portion. Then, the processed image can be stored as a properly focused image.

The auto-focusing camera module 100 and the imaging method using the auto-focusing camera module 100 determine a shooting mode according to an object distance and may select either a mechanical manner or a digital manner to generate a sharp image. In addition, the auto focusing camera module 100 can detect and correct image blur because of shaking before or during shooting, thus a satisfactory auto-focusing result can be ensured.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An auto-focusing camera module, comprising:
a lens module for capturing an image of an object;
an image sensor aligned with the lens module for sensing the image captured by the lens module;
a color separation unit electrically connected to the image sensor for separating the image sensed by the image sensor into red image, green image and blue image;
a main processor unit electrically connected to the color separation unit, the main processor unit being configured for calculating MTF values of the image and determining a shooting mode of the auto-focusing camera, wherein the shooting mode comprises a close shooting mode and a long shooting mode;
an image processing unit electrically connected to the main processor unit, the image processing unit processing the image according to the MTF values calculated by the main processor unit to compensate blurs of the image caused by out of focus when the long shooting mode is selected;
a driving unit electrically connected to the main processer unit, the driving unit moving the lens module to an optimum focusing position according to the MTF values calculated by the main processor unit when the close shooting mode is selected; and
an OIS unit connected to the lens module and configured for detecting shakes of the auto-focusing camera module before shooting and driving the lens module to compensate the detected shakes.

2. The auto-focusing camera module of claim 1, wherein the lens module comprises at least one piece of aspherical lens.

3. The auto-focusing camera module of claim 2, wherein the OIS unit comprises a movable supporting portion, a shake detecting portion, a shake compensation calculating portion and a shake compensation driving portion, the movable supporting supports the at least one piece of lens and is configured for carrying the at least one piece of lens to move in a direction perpendicular to the optical axis, the shake detecting portion is configured for detecting shakes of the at least one piece of lens before shooting and transmitting the detecting result to the shake compensation calculating portion, the shake compensation calculating portion is configured for calculating a compensation value according to the detecting result of the shake detecting portion, the shake compensation driving portion is configured for driving the at least one piece of lens to compensate the shakes of the at least one piece of lens according to the compensation value.

4. The auto-focusing camera module of claim 1, wherein the image sensor comprises a plurality of pixel unit arranged in its sensing area, each pixel unit comprising a red pixel, a green pixel and a blue pixel, the image sensed by the image sensor comprises a plurality of image portions, each of which corresponds to a pixel unit.

5. The auto-focusing camera module of claim 4, wherein the main processor unit comprises:
a MTF calculating module configured for calculating MTF values of each image portion of the image;
an object distance calculating module configured for calculating an object distance of an object in each image portion of the image according to the MTF values;
an object distance judging module configured for determining the shooting mode according to the object distance of the object in each image portion;
a blur calculating module configured for comparing the MTF values of each image portion calculated by the MTF calculating module with corresponding predetermined MTF values, calculating the differences between the MTF values and the predetermined MTF values, and generating blur quantities of each image portion of the image according to the MTF value differences;
an offset calculating module is configured for calculating offset to compensate a blur of each image portion according to the blur quantities;
a focus calculating module is configured for calculating an optimum focusing position of the lens module according to the object distance of the object in each image portion; and
a driving distance calculating module is configured for calculating a driving distance of the lens module according to the optimum focusing position calculated by the focus calculating module.

6. The auto-focusing camera module of claim 5, wherein the MTF calculating module respectively calculates MTF values of each image portion of the red image, the green image and the blue image.

7. The auto-focusing camera module of claim 6, wherein the object distance judging module analyzes the object distances of the object in the image portions calculated by the object judging module to get an analysis result, compares the analysis result with a predetermined distance value, and determines the shooting mode.

8. The auto-focusing camera module of claim 7, wherein the object distance judging module analyzes the object distances of the object in the image potions and generates a main object distance representing the object distance of a main object in the image.

9. The auto-focusing camera module of claim 8, wherein the predetermined distance value is 40 cm; if the main object distance is more than 40 cm, the auto-focusing camera module is set at the long shooting mode; if the main object distance is equal to or less than 40 cm, the auto-focusing camera module is set at the close shooting mode.

10. The auto-focusing camera module of claim 1, wherein the driving unit is a piezoelectric actuator or a voice coil motor.

11. An imaging method, comprising:
starting a shake detecting function before shooting;
determining a shake distance upon a condition that a shake occurs;
making a distance compensation for the shake distance;
reading a sensed image of an object;
separating the image into red image, green image and blue image, wherein the image comprises a plurality of image portions;
calculating MTF values of each image portion of the image;
determining an object distance of the object in each image portion according to the MTF values of each image portion;
analyzing the object distances of the image potions to generate a main object distance representing the object distance of a main object in the image;
selecting a close shooting mode upon a condition that the object distance of the object is equal to or less than a predetermined distance value;
determining an optimum focusing position of a focusing lens upon a condition that the close shooting mode is selected;
determining a driving distance of the focusing lens according to the optimum focusing position;
driving the focusing lens to the optimum focusing position according to the driving distance; and
capturing images when the focusing lens being at the optimum focusing positions.

12. The imaging method of claim 11, comprising:
selecting a long shooting mode upon a condition that the main object distance is more than the predetermined distance value;
calculating quantity of blurring of each image portion according to the MTF values upon a condition that the long shooting mode is selected;
calculating offset for compensating blurring of each image portion according to the quantity of blurring of each image portion; and
processing each image portion according the offset of each image portion.

* * * * *